United States Patent
Morisawa et al.

(10) Patent No.: US 11,367,903 B2
(45) Date of Patent: Jun. 21, 2022

(54) NONAQUEOUS ELECTROLYTE SOLUTION AND NONAQUEOUS ELECTROLYTE SECONDARY BATTERY

(71) Applicant: Panasonic Intellectual Property Management Co., Ltd., Osaka (JP)

(72) Inventors: Naoya Morisawa, Hyogo (JP); Kazuhiro Iida, Tokyo (JP); Masaki Deguchi, Hyogo (JP); Atsushi Fukui, Hyogo (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 250 days.

(21) Appl. No.: 16/582,141

(22) Filed: Sep. 25, 2019

(65) Prior Publication Data
US 2020/0020987 A1   Jan. 16, 2020

Related U.S. Application Data

(63) Continuation of application No. PCT/JP2018/004360, filed on Feb. 8, 2018.

(30) Foreign Application Priority Data

Mar. 30, 2017 (JP) .............................. JP2017-067440

(51) Int. Cl.
| | | |
|---|---|---|
| *H01M 10/00* | (2006.01) | |
| *H01M 10/0569* | (2010.01) | |
| *H01M 4/1315* | (2010.01) | |
| *H01M 4/02* | (2006.01) | |

(52) U.S. Cl.
CPC ..... *H01M 10/0569* (2013.01); *H01M 4/1315* (2013.01); *H01M 2004/027* (2013.01); *H01M 2004/028* (2013.01); *H01M 2300/0034* (2013.01)

(58) Field of Classification Search
CPC .......... H01M 10/0567; H01M 10/052; H01M 2004/027; H01M 4/1315; H01M 2004/028; H01M 10/0569
See application file for complete search history.

(56) References Cited

U.S. PATENT DOCUMENTS

| | | |
|---|---|---|
| 2007/0287071 A1 | 12/2007 | Chiga et al. |
| 2015/0221985 A1* | 8/2015 | Abe ................. H01M 10/0569 |
| | | 429/329 |
| 2015/0270577 A1 | 9/2015 | Takezawa |
| 2016/0181672 A1 | 6/2016 | Abe et al. |
| 2016/0240858 A1* | 8/2016 | Yamada ............ H01M 10/0525 |
| 2017/0222268 A1 | 8/2017 | Abe et al. |
| 2019/0221889 A1* | 7/2019 | Chiga ............... H01M 10/0568 |

FOREIGN PATENT DOCUMENTS

| | | |
|---|---|---|
| JP | 2008-140760 A | 6/2008 |
| JP | 2015-111557 A | 6/2015 |
| JP | 2016-184462 A | 10/2016 |
| JP | 2017-004692 A | 1/2017 |
| WO | 2014/112026 A1 | 7/2014 |
| WO | 2015/030190 A1 | 3/2015 |
| WO | 2016/009994 A1 | 1/2016 |

OTHER PUBLICATIONS

International Search Report dated May 1, 2018, issued in counterpart Application No. PCYT/JP2018/004360 (2 pages).

* cited by examiner

*Primary Examiner* — Cynthia H Kelly
*Assistant Examiner* — Monique M Wills
(74) *Attorney, Agent, or Firm* — WHDA, LLP

(57) ABSTRACT

A nonaqueous electrolyte solution according to one embodiment of the present disclosure contains a lithium salt and a nonaqueous solvent; the nonaqueous solvent contains fluoroethylene carbonate and a chain carboxylic acid ester having a dielectric constant of 6.0 or more; the lithium salt contains $LiPO_2F_2$ and $LiSO_3F$; and the respective concentrations of $LiPO_2F_2$ and $LiSO_3F$ in the non-aqueous solvent are 0.15 mol/L or more.

13 Claims, No Drawings

NONAQUEOUS ELECTROLYTE SOLUTION AND NONAQUEOUS ELECTROLYTE SECONDARY BATTERY

TECHNICAL FIELD

The present invention relates to a non-aqueous electrolyte solution and a technology of a non-aqueous electrolyte secondary battery using the non-aqueous electrolyte solution.

BACKGROUND ART

In recent years, as a secondary battery with high output and a high energy density, a non-aqueous electrolyte secondary battery has been widely used, the battery comprising a positive electrode, a negative electrode, and a non-aqueous electrolyte solution wherein lithium ions are transferred between the positive electrode and the negative electrode to perform charge/discharge.

For example, Patent Literature 1 discloses a non-aqueous electrolyte secondary battery comprising a positive electrode, a negative electrode, and a non-aqueous electrolyte solution including fluoroethylene carbonate and a chain carboxylate ester. Patent Literature 1 discloses that good battery characteristics of the non-aqueous electrolyte secondary battery can be obtained by using the non-aqueous electrolyte solution including fluoroethylene carbonate and a chain carboxylate ester.

CITATION LIST

Patent Literature

Patent Literature 1: Japanese Unexamined Patent Application Publication No. 2008-140760

SUMMARY

However, in a non-aqueous electrolyte secondary battery using a non-aqueous electrolyte solution comprising fluoroethylene carbonate and a chain carboxylate ester, fluoroethylene carbonate is reductively decomposed on the negative electrode and the like by charge/discharge under a high temperature environment (for example, 45° C. or more) to generate hydrofluoric acid (HF). The generated hydrofluoric acid decomposes the components of the non-aqueous electrolyte solution such as a lithium salt and a chain carboxylate ester. As a result, the charge/discharge cycle characteristics under a high temperature environment may deteriorate.

In the non-aqueous electrolyte secondary battery using the non-aqueous electrolyte solution further including fluoroethylene carbonate and a chain carboxylate ester, it cannot be said that sufficient output characteristics are obtained, and there is room for improvement.

Accordingly, an object of the present disclosure is to provide a non-aqueous electrolyte solution capable of suppressing deterioration of good output characteristics of the non-aqueous electrolyte secondary battery and charge/discharge cycle characteristics under a high temperature environment, and a non-aqueous electrolyte secondary battery using the non-aqueous electrolyte solution.

The non-aqueous electrolyte solution according to one aspect of the present disclosure comprises a lithium salt and a non-aqueous solvent; the non-aqueous solvent includes fluoroethylene carbonate and a chain carboxylate ester having a dielectric constant of 6.0 or more; the lithium salt includes $LiPO_2F_2$ and $LiSO_3F$; and respective concentrations of $LiPO_2F_2$ and $LiSO_3F$ in the non-aqueous solvent are 0.15 mol/L or more.

The non-aqueous electrolyte secondary battery according to one aspect of the present disclosure includes a positive electrode, a negative electrode, and a non-aqueous electrolyte solution; the non-aqueous electrolyte solution includes a lithium salt and a non-aqueous solvent; the non-aqueous solvent includes fluoroethylene carbonate and a chain carboxylate ester having a dielectric constant of 6.0 or more; the lithium salt includes $LiPO_2F_2$ and $LiSO_3F$; and respective concentrations of the $LiPO_2F_2$ and the $LiSO_3F$ in the non-aqueous solvent are 0.15 mol/L or more.

According to one aspect of the present disclosure, it is possible to suppress the deterioration of good output characteristics of the non-aqueous electrolyte secondary battery and charge/discharge cycle characteristics under a high temperature environment.

DESCRIPTION OF EMBODIMENTS

The non-aqueous electrolyte solution according to one aspect of the present disclosure includes a lithium salt and a non-aqueous solvent; the non-aqueous solvent includes fluoroethylene carbonate and a chain carboxylate ester having a dielectric constant of 6.0 or more; the lithium salt includes $LiPO_2F_2$ and $LiSO_3F$; and respective concentrations of $LiPO_2F_2$ and $LiSO_3F$ in the non-aqueous solvent are 0.15 mol/L or more. Using the non-aqueous electrolyte solution can suppress the deterioration of good output characteristics of the non-aqueous electrolyte secondary battery and charge/discharge cycle characteristics under a high temperature environment. This mechanism is not clear enough, but the following can be assumed.

Conventionally, it is known that the viscosity of a non-aqueous electrolyte solution is reduced by using a chain carboxylate ester as a non-aqueous solvent in the non-aqueous electrolyte solution including a lithium salt and the non-aqueous solvent. Since the chain carboxylate ester is highly reactive with the negative electrode, the chain carboxylate ester is decomposed on the negative electrode during charge/discharge of the non-aqueous electrolyte secondary battery. However, it is also known that the above decomposition of the chain carboxylate ester is suppressed by coexistence with fluoroethylene carbonate. Thus, conventionally, in the non-aqueous electrolyte secondary battery using the non-aqueous solvent including the chain carboxylate ester and fluoroethylene carbonate, it has been assumed that suppressing the decomposition of the chain carboxylate ester on the negative electrode can lower the viscosity of the non-aqueous electrolyte solution and good charge/discharge cycle characteristics can be obtained.

However, as described above, fluoric acid generated by decomposition of fluoroethylene carbonate decomposes a non-aqueous solvent such as a chain carboxylate ester, a lithium salt, and the like under a high temperature environment (for example, 45° C. or more), and hence, for example, the viscosity of the non-aqueous electrolyte solution and the electrode interface resistance increase. As a result, under a high temperature environment, the charge/discharge cycle characteristics of the non-aqueous electrolyte secondary battery deteriorate.

However, as the non-aqueous electrolyte solution according to one aspect of the present disclosure, including the chain carboxylate ester having a dielectric constant of 6.0 or more and fluoroethylene carbonate can provide the high concentration solution including 0.15 mol/L or more of $LiPO_2F_2$ and $LiSO_3F$ based on the non-aqueous solvent. Respective concentrations of the $LiPO_2F_2$ and the $LiSO_3F$ in the non-aqueous solvent are 0.15 mol/L or more. This forms, on the negative electrode (and the positive electrode), a film having a large amount of components derived from $LiPO_2F_2$ and $LiSO_3F$ and a less amount of LiF and alkyl carbonate compounds which are decomposition products of fluoroethylene carbonate and chain carboxylate esters. The film suppresses excessive decomposition of fluoroethylene carbonate on the negative electrode (and on the positive electrode). In addition, along with the suppression of the decomposition of fluoroethylene carbonate, the generation of hydrofluoric acid is also suppressed, and hence the decomposition of the chain carboxylate ester or the like is also suppressed. It is assumed that these results suppress increases in viscosity of the non-aqueous electrolyte solution and the electrode interface resistance and hence suppress deterioration of charge/discharge cycle characteristics of the non-aqueous electrolyte secondary battery under a high temperature environment. In addition, a film including a large amount of components derived from $LiPO_2F_2$ and $LiSO_3F$ is assumed to have high ion conductivity. Therefore, the non-aqueous electrolyte solution according to one aspect of the present disclosure can provide good output characteristics of the non-aqueous electrolyte secondary battery as compared to the non-aqueous electrolyte solution using a lithium salt which does not include a high concentration of $LiPO_2F_2$ and $LiSO_3F$. An example of a member constituting the non-aqueous electrolyte secondary battery includes a metal member such as a metal battery case, and since the generation of hydrofluoric acid is suppressed by the non-aqueous electrolyte solution according to one aspect of the present disclosure, the corrosion of the metal member by the hydrofluoric acid is also suppressed.

Hereinafter, the embodiment of the non-aqueous electrolyte secondary battery comprising the non-aqueous electrolyte solution according to one aspect of the present disclosure will be described. The embodiment described below is an example and the present disclosure is not limited thereto.

The non-aqueous electrolyte secondary battery, which is an example of the embodiment, comprises a positive electrode, a negative electrode, a separator, a non-aqueous electrolyte solution, and a battery case. Specifically, it has a structure in which a wound electrode body with the positive electrode and the negative electrode wound together with the separator therebetween, and the non-aqueous electrolyte solution are accommodated in the battery case. The electrode body is not limited to the wound electrode body, and electrode bodies in other forms may be applied such as a laminated electrode body with the positive electrode and the negative electrode laminated via the separator. The form of the non-aqueous electrolyte secondary battery is not particularly limited, and examples thereof include cylindrical, square, coin, button, and laminated types.

Hereinafter, the non-aqueous electrolyte solution, the positive electrode, the negative electrode, and the separator used for the non-aqueous electrolyte secondary battery which is an example of the embodiment will be described in detail.

[Non-Aqueous Electrolyte Solution]

The non-aqueous electrolyte solution includes a non-aqueous solvent and a lithium salt. The non-aqueous solvent includes fluoroethylene carbonate and a chain carboxylate ester having a dielectric constant of 6.0 or more. The lithium salt includes $LiPO_2F_2$ and $LiSO_3F$, and respective concentrations of $LiPO_2F_2$ and $LiSO_3F$ in the non-aqueous solvent are 0.15 mol/L or more.

Examples of the chain carboxylate ester having a dielectric constant of 6.0 or more include methyl acetate, ethyl acetate, n-propyl acetate, i-propyl acetate, methyl propionate, ethyl propionate, n-propyl propionate, i-propyl propionate, methyl n-butyrate, ethyl n-butyrate, n-propyl n-butyrate, i-propyl n-butyrate, methyl i-butyrate, ethyl i-butyrate, n-propyl i-butyrate, and i-propyl i-butyrate. These esters may be used singly or in combinations of two or more. The dielectric constant is measured by a dielectric meter.

Using the chain carboxylate ester having a dielectric constant of 6.0 or more as the non-aqueous solvent allows for the respective concentrations of $LiPO_2F_2$ and $LiSO_3F$ dissolved in the non-aqueous solvent to be 0.15 mol/L or more. In the non-aqueous solvent including the chain carboxylate ester, since the dielectric constant of the chain carboxylate ester of less than 6.0 does not allow for the respective concentrations of $LiPO_3F_2$ and $LiSO_3F$ dissolved in the non-aqueous solvent to be 0.15 mol/L or more, output characteristics of the non-aqueous electrolyte secondary battery deteriorate, or charge/discharge cycle characteristics under a high temperature environment deteriorate as compared to the non-aqueous electrolyte solution of the present embodiment. The upper limit of the dielectric constant of the chain carboxylate ester is not particularly limited, and is, for example, 20.0. Among the above examples of the chain carboxylate ester, methyl acetate (MA), ethyl acetate (EA), methyl propionate (MP), and the like are preferable, from the viewpoint of having a dielectric constant of 6.0 or more and allowing further increase in the concentrations of $LiPO_2F_2$ and $LiSO_3F$ dissolved in the non-aqueous solvent. That is, the chain carboxylate ester preferably includes at least one of methyl acetate (MA), ethyl acetate (EA), and methyl propionate (MP).

The content of the chain carboxylate ester having a dielectric constant of 6.0 or more in the non-aqueous solvent is, for example, preferably 50% by volume or more, and more preferably 55% by volume or more and 85% by volume or less. When the content of the chain carboxylate ester having a dielectric constant of 6.0 or more in the non-aqueous solvent is less than 50% by volume, at least any one of the concentrations of $LiPO_2F_2$ and $LiSO_3F$ in the non-aqueous solvent may be difficult to be 0.15 mol/L or more, depending on the type of the chain carboxylate ester. In addition, when the content of the chain carboxylate ester having a dielectric constant of 6.0 or more in the non-aqueous solvent is less than 50% by volume, the viscosity of the non-aqueous electrolyte solution increases and, for example, output characteristics of the non-aqueous electrolyte secondary battery may deteriorate as compared to in the case where the content of the chain carboxylate ester is 50% by volume or more.

The non-aqueous solvent preferably further includes a fluorinated chain carboxylate ester. The dielectric constant is increased by including fluorine having a high electronegativity. The content of the fluorinated chain carboxylate ester in the non-aqueous solvent is preferably 1% by volume or more and 30% by volume or less, and more preferably 10% by volume or more and 25% by volume or less. The fluorinated chain carboxylate ester is reductively decomposed on the negative electrode to form a film, thereby allowing suppression of the decomposition of fluoroethylene carbonate and the chain carboxylate ester, but the large number of the molecules increases the viscosity of the non-aqueous electrolyte solution. However, the viscosity of the non-aqueous electrolyte solution can be reduced by coexistence of the fluorinated chain carboxylate ester having the above content with a chain carboxylate ester having a dielectric constant of 6.0 or more, particularly at least one of methyl acetate, ethyl acetate, and methyl propionate, for example, allowing suppression of deterioration of charge/discharge cycle characteristics of the non-aqueous electrolyte secondary battery under a high temperature environment. The fluorinated chain carboxylate ester includes at least one selected from, for example, methyl 3,3,3-trifluoropropionate (FMP: dielectric constant of 15.5), 2,2,2-trifluoroethyl acetate (FEA: dielectric constant of 6.7), methyl 2,3,3,3-tetrafluoropropionate, and methyl 2,3,3-trifluoropropionate. From the viewpoint such as suppressing the deterioration of the charge/discharge cycle characteristics of the non-aqueous electrolyte secondary battery, the fluorinated chain carboxylate ester preferably includes methyl 3,3,3-trifluoropropionate ($CF_3CH_2CO—OCH_3$) and 2,2,2-trifluoroethyl acetate ($CH_3CO—OCH_2CF_3$). Since methyl 3,3,3-trifluoropropionate ($CF_3CH_2CO—OCH_3$) and 2,2,2-trifluoroethyl acetate ($CH_3CO—OCH_2CF_3$) are isomers having the same molecular weight and close in structure, the reactivity is assumed to be similar. They have the same $CF_3CH_2$ group and have less steric repulsion than other molecules, and in the film formation reaction in the decomposition of $LiPO_2F_2$ and $LiSO_3F$, it is assumed that when these molecules coexist, they are easily incorporated into the film formation reaction to form a denser film.

The content of fluoroethylene carbonate in the non-aqueous solvent is, for example, preferably 5% by volume or more and 30% by volume or less, and more preferably 10% by volume or more and 20% by volume or less. When the content of fluoroethylene carbonate is less than 5% by volume, a film may not be sufficiently formed as compared to the case where the above range is satisfied, and good charge/discharge cycle characteristics may not be obtained. When the content of fluoroethylene carbonate exceeds 30% by volume, the proportion of the LiF component included in the film becomes large as compared to the case where the above range is satisfied and thereby the resistance increases, and the content of the chain carboxylate ester is relatively reduced to increase the viscosity of the electrolyte solution and thereby sufficient output characteristics may not be obtained.

The non-aqueous solvent may include other non-aqueous solvents in addition to a chain carboxylate ester having a dielectric constant of 6.0 or more, fluoroethylene carbonate, and a fluorinated chain carboxylate ester. Examples of other non-aqueous solvents include at least one non-aqueous solvent selected from cyclic carbonates such as ethylene carbonate, propylene carbonate, and butylene carbonate; chain carbonates such as dimethyl carbonate, diethyl carbonate, and methyl ethyl carbonate; cyclic ethers such as 1,3-dioxolane and tetrahydrofuran; chain ethers such as 1,2-dimethoxyethane and diethyl ether; nitriles such as acetonitrile; and amides such as dimethylformamide.

The respective concentrations of $LiPO_2F_2$ and $LiSO_3F$ may be 0.15 mol/L based on the non-aqueous solvent, but further increasing the concentrations can provide high density and uniform film formation. For example, it is preferably 0.18 mol/L or more, and more preferably 0.2 mol/L or more, in order to improve the output characteristics of the non-aqueous electrolyte secondary battery and to suppress the deterioration of charge/discharge cycle characteristics under a high temperature environment. The upper limits of the concentrations of $LiPO_2F_2$ and $LiSO_3F$ are not particularly limited, and are, for example, 0.5 mol/L.

The lithium salt preferably includes $LiPF_6$ in addition to $LiPOF_2$ and $LiSO_3F$. The concentration of the lithium salt including $LiPO_2F_2$, $LiSO_3F$, and $LiPF_6$ is preferably 1.7 mol/L or more, and more preferably 1.8 mol/L or more based on the non-aqueous solvent. When the concentration of the Li salt is increased, the amount of the chain carboxylate ester contributing to solvation is increased to provide stabilization, and thereby the decomposition is suppressed. As a result, the film is rich in components derived from $LiPO_2F_2$ and $LiSO_3F$, and the ion conductivity is further improved. When the concentration of the lithium salt including $LiPO_2F_2$, $LiSO_3F$, and $LiPF_6$ is 1.7 mol/L or more based on the non-aqueous solvent, for example, the charge/discharge capacity of the non-aqueous electrolyte secondary battery may be improved as compared to the case where the concentration of the lithium salt including $LiPO_2F_2$, $LiSO_3F$, and $LiPF_6$ does not satisfy the above range. The upper limit of the concentration of $LiPF_6$ is not particularly limited, and is, for example, 3.0 mol/L.

The lithium salt preferably includes LiFSA (lithium bis(fluorosulfonyl) amide) in addition to $LiPO_2F_2$ and $LiSO_3F$, and more preferably includes LiFSA and $LiPF_6$. Including LiFSA not only improves the conductivity of the non-aqueous electrolyte solution and but also forms a film by the reaction of the FSA anion with $LiPO_2F_2$ and $LiSO_3F$ decomposition products, for example forms a sulfonamide compound or a phosphonylamide compound, on the negative electrode, allowing suppression of decomposition of fluoroethylene carbonate under a high temperature environment. The content of LiFSA in the lithium salt is preferably 20 mol % or more and 80 mol % or less, and more preferably 30 mol % or more and 70 mol % or less. When the content of LiFSA in the lithium salt is 20 mol % or more and 80 mol % or less, for example, the output characteristics of the non-aqueous electrolyte secondary battery and the charge/discharge cycle characteristics under a high temperature environment are improved as compared to the case where the content of LiFSA in the lithium salt does not satisfy the above range.

The lithium salt may include other lithium salts in addition to the above lithium salt. Examples of other lithium salts include $LiBF_4$, $LiAsF_6$, $LiClO_4$, $LiCF_3SO_3$, $LiN(FSO_2)_2$, $LiN(C_lF_{2l+1}SO_2)(C_mF_{2m+1}SO_2)$ (l and m are integers of 1 or more), $LiC(C_pF_{2p+1}SO_2)(C_qF_{2q+1}SO_2)(C_rF_{2r+1}SO_2)$ (p, q, and r are integers of 1 or more), $Li[B(C_2O_4)_2]$(bis(oxalate) lithium borate (LiBOB)), $Li[B(C_2O_4)F_2]$, $Li[P(C_2O_4)F_4]$, and $Li[P(C_2O_4)_2F_2]$. These lithium salts may be used singly or in combinations of two or more.

An additive may be added to the non-aqueous electrolyte solution in order to improve the charge/discharge characteristics of the battery. Examples of such additives include 1-chloro-1,4,4,4-tetrafluorobutan-2-one (CTFB), vinylene carbonate (VC), vinyl ethylene carbonate, cyclohexylbenzene, and fluorobenzene. The amount of the additive in the non-aqueous electrolyte is, for example, 0.01 to 15% by mass, and may be 0.05 to 10% by mass. Particularly, the presence of 1-chloro-1,4,4,4-tetrafluorobutan-2-one (CTFB) in the electrolyte solution accelerates the decomposition of $LiPO_2F_2$ and $LiSO_3F$ to provide a film that is rich in $PO_2F_2$ and $SO_3F$ components in the film, further improving the ion conductivity. Moreover, Cl is included in the film derived from 1-chloro-1,4,4,4-tetrafluorobutan-2-one (CTFB). Cl is easy to attract lithium ions because of high electronegativity, but on the other hand, interaction of Cl with lithium ions is small because of a larger atomic radius than lithium. That is, it is assumed that in the charge/discharge process of the non-aqueous electrolyte secondary battery, lithium ions are attracted to Cl in the film, but move relatively smoothly through the film because of no bond with Cl. Therefore, the film derived from 1-chloro-1,4,4,4-tetrafluorobutan-2-one (CTFB) has higher permeability of lithium ions as compared to a film without Cl, improving the output characteristics of the non-aqueous electrolyte secondary battery.

[Positive Electrode]

The positive electrode is composed of, for example, a positive electrode current collector such as a metal foil, and a positive electrode active material layer formed on the positive electrode current collector. As the positive electrode current collector, a foil of a metal, such as aluminum, that is stable in the electric potential range of the positive electrode, a film in which the metal is disposed on an outer layer, and the like can be used. The positive electrode active material layer includes, for example, a positive electrode active material, a binder, and an electrical conductor.

The positive electrode is obtained, for example, by applying and drying a positive electrode mixture slurry including a positive electrode active material, a binder, an electrical conductor, and the like onto the positive electrode current collector to form the positive electrode active material layer on the positive electrode current collector and by rolling the positive electrode active material layer.

Examples of the positive electrode active material include lithium transition metal composite oxide, and specific examples thereof include lithium cobaltate, lithium manganate, lithium nickelate, lithium nickel manganese composite oxide, and lithium nickel cobalt composite oxide. These may be used singly or in combinations of two or more.

Examples of the electrical conductor include carbon powders such as carbon black, acetylene black, ketjen black, and graphite. These may be used singly or in combinations of two or more.

Examples of the binder include fluorine polymers and rubber polymers. Examples of the fluorine polymer include polytetrafluoroethylene (PTFE), polyvinylidene fluoride (PVdF), and modified products thereof, and examples of the rubber polymer include ethylene-propylene-isoprene copolymer and ethylene-propylene-butadiene copolymer.

These may be used singly or in combinations of two or more.

[Negative Electrode]

The negative electrode comprises, for example, a negative electrode current collector such as a metal foil, and a negative electrode active material layer fonned on the negative electrode current collector. As the negative electrode current collector, a foil of a metal, such as copper, that is stable in the electric potential range of the negative electrode, a film in which the metal is disposed on an outer layer, and the like can be used. The negative electrode active material layer includes, for example, a negative electrode active material, a binder, and a thickener.

The negative electrode is obtained, for example, by applying and drying a negative electrode mixture slurry including a negative electrode active material, a thickener, and a binder on the negative electrode current collector to form the negative electrode active material layer on the negative electrode current collector and by rolling the negative electrode active material layer.

The negative electrode active material is not particularly limited as long as it is a material capable of absorbing and desorbing lithium ions, and examples thereof include lithium alloy such as metallic lithium, lithium-aluminum alloy, lithium-lead alloy, lithium-silicon alloy, and lithium-tin alloy; carbon materials such as graphite, coke, and organic sintered body; and metal oxides such as $SnO_2$, SnO, and $TiO_2$. These may be used singly or in combinations of two or more.

As the binder, for example, as in the case of the positive electrode, a fluorine polymer, a rubber polymer, or the like can also be used, and styrene-butadiene copolymer (SBR) or a modified product thereof may also be used.

Examples of the thickener include carboxymethylcellulose (CMC) and polyethylene oxide (PEO). These may be used singly or in combinations of two or more.

The negative electrode active material layer preferably includes a lithium salt in addition to the above negative electrode active material and the like. It is assumed that including a lithium salt in the negative electrode active material layer forms a higher density and uniform composite film derived from $LiPO_2F_2$ and $LiSO_3F$ formed on the electrode, and the deterioration of the charge/discharge cycle characteristics of the non-aqueous electrolyte secondary battery is further suppressed as compared to the case where the lithium salt is not included in the negative electrode active material layer.

Examples of the lithium salt included in the negative electrode active material layer include lithium borate, lithium sulfate, and lithium phosphate, and among these, lithium borate is preferable. For example, lithium tetraborate is particularly preferable from the viewpoint of high reactivity with $PO_2F_2$— and $SO_3F$—. The average particle size of the lithium salt is not particularly limited, and is preferably 150 μm or less from the viewpoint that it is uniformly dispersed in the negative electrode mixture slurry. The content of the lithium salt in the negative electrode active material is preferably, for example, 0.1% by mass or more and 5% by mass or less from the viewpoint such as suppressing the deterioration of the charge/discharge cycle characteristics of the non-aqueous electrolyte secondary battery.

It is assumed that a composite film including Li, P, S, C, N. O, and F as constituent elements is formed on the surface of the negative electrode and specifically a composite film is formed, the film (1) including $PO_2F_2$— and $SO_3F$— derived from the decomposition product of $LiPO_2F_2$ and $LiSO_3F$ at a concentration of 0.15 mol/L or more based on the non-aqueous solvent and (2) having a less amount of LiF or organic components derived from the decomposition product of fluoroethylene carbonate or a chain carboxylate ester than an amount of the component in the above (1).

This composite film plays a role of suppressing the decomposition reaction of the non-aqueous electrolyte solution on the surface of the negative electrode. For example, at initial charge/discharge of the battery, $LiPO_2F_2$ and $LiSO_3F$ added to the non-aqueous electrolyte solution are decomposed and formed on the outermost surface of the negative electrode. The presence of the composite film including $PO_2F_2$— and $SO_3F$— can be confirmed by the XPS spectrum obtained by XPS measurement of the surface of the negative electrode. When the total amount of Li P, S, C, N, O, and F which are constituent elements of the composite film is calculated as 100 atomic %, in the surface of the negative electrode, the S atom is included at a proportion of 1% or more (S atomic %=S/[Li+P+S+C+N+O+F]) and the P atom is included at a proportion of 1% or more (P atomic %=P/[Li+P+S+C+N+O+F]).

[Separator]

As the separator, for example, a porous sheet or the like having ion permeability and insulating property is used. Specific examples of the porous sheet include a microporous thin film, woven fabric, and non-woven fabric. As the material of the separator, olefin resins such as polyethylene and polypropylene, cellulose, and the like are suitable. The separator may be a laminate having a cellulose fiber layer and a thermoplastic resin fiber layer such as an olefin resin. A multi-layered separator including a polyethylene layer and a polypropylene layer may be used, and a separator coated with a material such as an aramid resin or a ceramic on the surface of the separator may be used.

EXAMPLES

Hereinafter, the present disclosure will be described in more detail with reference to Examples, but the present disclosure is not limited to the following Examples.

[Solubility Test of $LiPO_2F_2$ and $LiSO_3F$]

The mixed solvent A was prepared by mixing fluoroethylene carbonate (FEC) and methyl acetate (dielectric constant of MA of 6.7) in a volume ratio of 2:8. The mixed solvent B was also prepared by mixing fluoroethylene carbonate (FEC) and ethyl acetate (dielectric constant of EA of 6.0) in a volume ratio of 2:8. The mixed solvent C was also prepared by mixing fluoroethylene carbonate (FEC) and methyl propionate (dielectric constant of MP of 6.2) in a volume ratio of 2:8. The mixed solvent D was prepared by mixing fluoroethylene carbonate (FEC) and ethyl methyl carbonate (dielectric constant of EMC of 3.0) in a volume ratio of 2:8. The mixed solvent E was also prepared by mixing fluoroethylene carbonate (FEC) and dimethyl carbonate (dielectric constant of DMC of 3.1) in a volume ratio of 2:8.

To each of the above mixed solvents A to E, $LiPF_6$ was added in an amount providing a concentration of 1.4 mol/L, $LiPO_2F_2$ was added in an amount providing a concentration of 0.2 mol/L. and $LiSO_3F$ was added in an amount providing a concentration of 0.2 mol/L, to prepare the non-aqueous electrolyte solutions A, B, C, D, and E. In addition, to the above mixed solvent A, $LiPF_6$ was added in an amount providing a concentration of 1.4 mol/L, $LiPO_2F_2$ was added in an amount providing a concentration of 0.3 mol/L, and $LiSO_3F$ was added in an amount providing a concentration of 0.3 mol/L, to prepare the non-aqueous electrolyte solution F; and $LiPF_6$ was added in an amount providing a concentration of 0.7 mol/L, LiFSA was added in an amount providing a concentration of 0.7 mol/L, $LiPO_2F_2$ was added in an amount providing a concentration of 0.3 mol/L, and $LiSO_3F$ was added in an amount providing a concentration of 0.3 mol/L, to prepare the non-aqueous electrolyte solution G.

In the non-aqueous electrolyte solutions A to C including a chain carboxylate ester (methyl acetate, ethyl acetate, or methyl propionate) having a dielectric constant of 6.0 or more, all the added lithium salts were dissolved. On the other hand, in the non-aqueous electrolyte solutions D to E including no chain carboxylate ester having a dielectric constant of 6.0 or more and including ethyl methyl carbonate or dimethyl carbonate having a dielectric constant of less than 4.0, a part of $LiPO_2F_2$ or $LiSO_3F$ was not dissolved. The concentrations of $LiPO_2F_2$ and $LiSO_3F$ dissolved in the non-aqueous electrolyte solution D were 0.12 mol/L based on the non-aqueous electrolyte solution D, and the concentrations of $LiPO_2F_2$ and $LiSO_3F$ dissolved in the non-aqueous electrolyte solution E were 0.13 mol/L based on the non-aqueous electrolyte solution E. That is, in the non-aqueous electrolyte solution including no chain carboxylate ester having a dielectric constant of 6.0 or more, the concentrations of $LiPO_2F_2$ and $LiSO_3F$ were not able to be 0.15 mol/L or more. In the non-aqueous electrolyte solution F including no LiFSA, a part of $LiPO_2F_2$ or $LiSO_3F$ at a concentration of 0.3 mol/L did not dissolve, but in the non-aqueous electrolyte solution G including LiFSA, all the above lithium salts were dissolved. The concentrations of $LiPO_2F_2$ and $LiSO_3F$ dissolved in the non-aqueous electrolyte solution F were 0.27 mol/L based on the non-aqueous electrolyte solution F. This is probably because the bisfluorosulfonylamide group that is the backbone of LiFSA has strong electron-withdrawing properties and negative charge on nitrogen are delocalized to improve dissociation properties, resulting in improvement in solubility of the lithium salt in the entire electrolyte solution.

Example 1

[Production of Positive Electrode]

Lithium-nickel composite oxide (NCA) as a positive electrode active material, acetylene black as an electrical conductor, and polyvinylidene fluoride as a binder were mixed so that the mass ratio became 100:1:0.9, and then N-methyl-2-pyrrolidone (NMP) was added to prepare a positive electrode mixture slurry. Thereafter, this positive electrode mixture slurry was applied to both surfaces of a positive electrode current collector consisting of an aluminum foil. The applying film was dried and then rolled using a rolling roller to produce a positive electrode in which a positive electrode active material layer was formed on both surfaces of the positive electrode current collector.

[Production of Negative Electrode]

Artificial graphite as a negative electrode active material, sodium salt of carboxymethylcellulose as a thickener, and a styrene-butadiene copolymer as a binder were mixed so that the mass ratio became 100:1:1, to prepare a negative electrode mixture slurry. Thereafter, this negative electrode mixture slurry was applied to both surfaces of a negative electrode current collector consisting of a copper foil. The applying film was dried and then rolled using a rolling roller to produce a negative electrode in which a negative electrode active material layer was formed on both surfaces of the positive electrode current collector.

[Preparation of Non-Aqueous Electrolyte Solution]

In the mixed solvent obtained by mixing fluoroethylene carbonate (FEC) and methyl acetate (MA) in a volume ratio of 2:8, $LiPF_6$ was dissolved to a concentration of 1.4 mol/L, $LiPO_2F_2$ was dissolved to a concentration of 0.2 mol/L, and $LiSO_3F$ was dissolved to a concentration of 0.2 mol/L, to prepare a non-aqueous electrolyte solution.

[Production of Non-Aqueous Electrolyte Secondary Battery]

The above positive electrode and negative electrode were wound with the separator therebetween to produce an electrode body, the electrode body and the above non-aqueous electrolyte solution were accommodated in a bottomed cylindrical battery case, and the opening part of the battery case was sealed with a gasket and a sealing body. This was the non-aqueous electrolyte secondary battery in Example 1.

Example 2

In the mixed solvent obtained by mixing fluoroethylene carbonate (FEC) and ethyl acetate (EA) in a volume ratio of 2:8, $LiPF_6$ was dissolved to a concentration of 1.4 mol/L, $LiPO_2F_2$ was dissolved to a concentration of 0.2 mol/L, and $LiSO_3F$ was dissolved to a concentration of 0.2 mol/L, to prepare a non-aqueous electrolyte solution. A non-aqueous electrolyte secondary battery was produced in the same manner as in Example 1 except that this non-aqueous electrolyte solution was used as the non-aqueous electrolyte solution in Example 2.

Example 3

In the mixed solvent obtained by mixing fluoroethylene carbonate (FEC) and methyl propionate (MP) in a volume ratio of 2:8, $LiPF_6$ was dissolved to a concentration of 1.4 mol/L, $LiPO_2F_2$ was dissolved to a concentration of 0.2 mol/L, and $LiSO_3F$ was dissolved to a concentration of 0.2 mol/L, to prepare a non-aqueous electrolyte solution. A non-aqueous electrolyte secondary battery was produced in the same manner as in Example 1 except that this non-aqueous electrolyte solution was used as the non-aqueous electrolyte solution in Example 3.

Example 4

In the mixed solvent obtained by mixing fluoroethylene carbonate (FEC), methyl acetate (MA), and dimethyl carbonate (DMC) in a volume ratio of 2:6:2, $LiPF_6$ was dissolved to a concentration of 1.4 mol/L, $LiPO_2F_2$ was dissolved to a concentration of 0.2 mol/L, and $LiSO_3F$ was dissolved to a concentration of 0.2 mol/L, to prepare a non-aqueous electrolyte solution. A non-aqueous electrolyte secondary battery was produced in the same manner as in Example 1 except that this non-aqueous electrolyte solution was used as the non-aqueous electrolyte solution in Example 4.

Example 5

In the mixed solvent obtained by mixing fluoroethylene carbonate (FEC), methyl acetate (MA), and methyl fluoropropionate (FMP) in a volume ratio of 2:6:2, $LiPF_6$ was dissolved to a concentration of 1.4 mol/L, $LiPO_2F_2$ was dissolved to a concentration of 0.2 mol/L, and $LiSO_3F$ was dissolved to a concentration of 0.2 mol/L, to prepare a non-aqueous electrolyte solution. A non-aqueous electrolyte secondary battery was produced in the same manner as in Example 1 except that this non-aqueous electrolyte solution was used as the non-aqueous electrolyte solution in Example 5.

Example 6

In the mixed solvent obtained by mixing fluoroethylene carbonate (FEC), methyl acetate (MA), and 2,2,2-trifluoroethyl acetate (FEA) in a volume ratio of 2:6:2, $LiPF_6$ was dissolved to a concentration of 1.4 mol/L, $LiPO_2F_2$ was dissolved to a concentration of 0.2 mol/L, and $LiSO_3F$ was dissolved to a concentration of 0.2 mol/L, to prepare a non-aqueous electrolyte solution. A non-aqueous electrolyte secondary battery was produced in the same manner as in Example 1 except that this non-aqueous electrolyte solution was used as the non-aqueous electrolyte solution in Example 6.

Example 7

In the mixed solvent obtained by mixing fluoroethylene carbonate (FEC), methyl acetate (MA), and 2,2,2-trifluoroethyl acetate (FEA) in a volume ratio of 2:6:2, 1-chloro-1,4,4,4-tetrafluorobutan-2-one (CTFB) was dissolved to a concentration of 0.01% by mass, $LiPF_6$ was dissolved to a concentration of 1.4 mol/L, $LiPO_2F_2$ was dissolved to a concentration of 0.2 mol/L, and $LiSO_3F$ was dissolved to a concentration of 0.2 mol/L, to prepare a non-aqueous electrolyte solution. A non-aqueous electrolyte secondary battery was produced in the same manner as in Example 1 except that this non-aqueous electrolyte solution was used as the non-aqueous electrolyte solution in Example 7.

Example 8

In the mixed solvent obtained by mixing fluoroethylene carbonate (FEC) and methyl acetate (MA) in a volume ratio of 2:8, $LiPF_6$ was dissolved to a concentration of 0.7 mol/L, LiFSA was dissolved to a concentration of 0.7 mol/L, $LiPO_2F_2$ was dissolved to a concentration of 0.2 mol/L, and $LiSO_3F$ was dissolved to a concentration of 0.2 mol/L, to prepare a non-aqueous electrolyte solution. A non-aqueous electrolyte secondary battery was produced in the same manner as in Example 1 except that this non-aqueous electrolyte solution was used as the non-aqueous electrolyte solution in Example 8.

Example 9

A negative electrode was produced in the same manner in Example 1 except that artificial graphite as a negative electrode active material, sodium salt of carboxymethylcellulose as a thickener, a styrene-butadiene copolymer as a binder, and lithium tetraborate were mixed so that the mass ratio became 100:1:1:0.5 to prepare a negative electrode mixture slurry. A non-aqueous electrolyte secondary battery was produced in the same manner as in Example 1 except that this negative electrode was used as the negative electrode in Example 9.

Comparative Example 1

In the mixed solvent obtained by mixing fluoroethylene carbonate (FEC) and methyl acetate (MA) in a volume ratio of 2:8, $LiPF_6$ was dissolved to a concentration of 1.4 mol/L, to prepare a non-aqueous electrolyte solution. A non-aqueous electrolyte secondary battery was produced in the same manner as in Example 1 except that this non-aqueous electrolyte solution was used as the non-aqueous electrolyte solution in Comparative Example 1.

Comparative Example 2

In the mixed solvent obtained by mixing fluoroethylene carbonate (FEC) and methyl acetate (MA) in a volume ratio of 2:8, $LiPF_6$ was dissolved to a concentration of 0.7 mol/L and LiFSA was dissolved to a concentration of 0.7 mol/L, to prepare a non-aqueous electrolyte solution. A non-aqueous electrolyte secondary battery was produced in the same manner as in Example 1 except that this non-aqueous electrolyte solution was used as the non-aqueous electrolyte solution in Comparative Example 2.

Comparative Example 3

In the mixed solvent obtained by mixing fluoroethylene carbonate (FEC) and methyl acetate (MA) in a volume ratio of 2:8, $LiPF_6$ was dissolved to a concentration of 1.4 mol/L and $LiPO_2F_2$ was dissolved to a concentration of 0.2 mol/L, to prepare a non-aqueous electrolyte solution. A non-aqueous electrolyte secondary battery was produced in the same manner as in Example 1 except that this non-aqueous electrolyte solution was used as the non-aqueous electrolyte solution in Comparative Example 3.

Comparative Example 4

In the mixed solvent obtained by mixing fluoroethylene carbonate (FEC) and methyl acetate (MA) in a volume ratio of 2:8, $LiPF_6$ was dissolved to a concentration of 1.4 mol/L and $LiSO_3F$ was dissolved to a concentration of 0.2 mol/L, to prepare a non-aqueous electrolyte solution. A non-aqueous electrolyte secondary battery was produced in the same manner as in Example 1 except that this non-aqueous electrolyte solution was used as the non-aqueous electrolyte solution in Comparative Example 4.

Comparative Example 5

In the mixed solvent obtained by mixing fluoroethylene carbonate (FEC) and methyl acetate (MA) in a volume ratio of 2:8, $LiPF_6$ was dissolved to a concentration of 1.4 mol/L, $LiPO_2F_2$ was dissolved to a concentration of 0.1 mol/L, and $LiSO_3F$ was dissolved to a concentration of 0.1 mol/L, to prepare a non-aqueous electrolyte solution. A non-aqueous electrolyte secondary battery was produced in the same manner as in Example 1 except that this non-aqueous electrolyte solution was used as the non-aqueous electrolyte solution in Comparative Example 5.

[Charge/Discharge Cycle Test]

At an environmental temperature of 45° C., constant current charging was performed at 0.5 It with the batteries of Examples and Comparative Examples until the voltage was 4.2 V. Then, constant voltage charging was performed at a voltage of 4.2 V until the current value was 0.02 It. After resting for 10 minutes, constant current discharging was performed at 0.5 It until the voltage was 3.0 V, and then resting for 20 minutes. This charge/discharge was performed for 100 cycles. The capacity maintenance factor was determined by the following formula. This value is higher, indicating that the deterioration of the charge/discharge cycle characteristics is more suppressed.

Capacity maintenance factor=(discharge capacity at 100th cycle/discharge capacity at 1st cycle)×100

[Measurement of Direct Current Resistance (DC-IR)]

At an environmental temperature of 25° C., constant current charging was performed at 0.2 It with the batteries of Examples and Comparative Examples until the voltage was 4.2 V. Then, constant voltage charging was performed at a voltage of 4.2 V until the current value was 0.02 It. The open voltage after resting for 20 minutes was $V_0$. Then, constant current discharging was performed for 10 seconds at 1.0 It. The voltage at this time was $V_1$. DC-IR was calculated by the following formula. It can be deemed that the lower this value, the better the output characteristics of the non-aqueous electrolyte secondary battery.

$$DC\text{-}IR=(V_0-V_1)/1.0 \text{ It}$$

Table 1 shows the results of capacity maintenance factor at 45° C./100 cycle charge/discharge and direct current resistance (DC-IR) in composition of the non-aqueous electrolyte solution used in each Example and Comparative Example and the non-aqueous electrolyte secondary battery in each Example and Comparative Example. However, in the direct current resistance, the direct current resistances of the other batteries are relatively shown based on the direct current resistance of the battery in Comparative Example 1 (100%).

TABLE 1

| | Non-aqueous electrolyte solution | | | Negative electrode active material | Battery characteristics | |
|---|---|---|---|---|---|---|
| | | | | With or without | Capacity | DC-IR |
| | Lithium salt (mol/L) | Non-aqueous solvent (mass ratio) | With or without addition of CTFB (0.01% by mass) | Addition of lithium tetraborate (0.5% by mass) | maintenance factor 45° C./100 cycles charge/discharge | (Comparative Example 1 set as 100% as reference) |
| Example 1 | $LiPF_6/LiPO_2F_2/LiSO_3F$ (1.4/0.2/0.2) | FEC/MA (2/8) | Without | Without | 93% | 85 |
| Example 2 | | FEC/EA (2/8) | Without | Without | 92% | 88 |
| Example 3 | | FEC/MP (2/8) | Without | Without | 93% | 90 |
| Example 4 | | FEC/MA/DMC (2/6/2) | Without | Without | 94% | 88 |
| Example 5 | | FEC/MA/FMP (2/6/2) | Without | Without | 95% | 90 |
| Example 6 | | FEC/MA/FEA (2/6/2) | Without | Without | 94% | 89 |
| Example 7 | | | With | Without | 94% | 88 |
| Example 8 | $LiPF_6/LiFSA/LiPO_2F_2/LiSO_3F$ (0.7/0.7/0.2/0.2) | FEC/MA (2/8) | Without | Without | 94% | 80 |
| Example 9 | $LiPF_6/LiPO_2F_2/LiSO_3F$ (1.4/0.2/0.2) | FEC/MA (2/8) | Without | With | 94% | 82 |
| Comparative Example 1 | $LiPF_6$ (1.4) | | Without | Without | 90% | 100 |
| Comparative Example 2 | $LiPF_6/LiFSA$ (0.7/0.7) | | Without | Without | 90% | 98 |
| Comparative Example 3 | $LiPF_6/LiPO_2F_2$ (1.4/0.2) | | Without | Without | 91% | 95 |
| Comparative Example 4 | $LiPF_6/LiSO_3F$ (1.4/0.2) | | Without | Without | 91% | 96 |
| Comparative Example 5 | $LiPF_6/LiPO_2F_2/LiSO_3F$ (1.4/0.1/0.1) | | Without | Without | 91% | 93 |

The non-aqueous electrolyte secondary battery in Examples 1 to 9 exhibited high capacity maintenance factors at 45° C./100 cycles of charge/discharge, and exhibited low values of DC-IR, compared with the non-aqueous electrolyte secondary batteries in Comparative Examples 1 to 5. These results indicated that good output characteristics of the non-aqueous electrolyte secondary battery is obtained by using the non-aqueous electrolyte solution having the non-aqueous solvent including fluoroethylene carbonate and a chain carboxylate ester having a dielectric constant of 6.0 or more and the lithium salt including $LiPO_2F_2$ and $LiSO_3F$ in which the respective concentrations of $LiPO_2F_2$ and $LiSO_3F$ are 0.15 mol/L or more based on the non-aqueous solvent, allowing suppression of the deterioration of charge/discharge cycle characteristics of the non-aqueous electrolyte secondary battery under a high temperature environment.

The invention claimed is:

1. A non-aqueous electrolyte solution, comprising:
a lithium salt; and
a non-aqueous solvent, wherein
the non-aqueous solvent includes fluoroethylene carbonate (FEC) and a chain carboxylate ester having a dielectric constant of 6.0 or more;
the lithium salt includes $LiPO_2F_2$ and $LiSO_3F$, and respective concentrations of the $LiPO_2F_2$ and the $LiSO_3F$ in the non-aqueous solvent are 0.15 mol/L or more.

2. The non-aqueous electrolyte solution according to claim 1, wherein the chain carboxylate ester includes at least one of methyl acetate (MA), ethyl acetate (EA), and methyl propionate (MP).

3. The non-aqueous electrolyte solution according to claim 1, wherein a content of the chain carboxylate ester in the non-aqueous solvent is 50% by volume or more.

4. The non-aqueous electrolyte solution according to claim 1, wherein
the lithium salt further includes $LiPF_6$ and
a concentration of the lithium salt in the non-aqueous solvent is 1.7 mol/L or more.

5. The non-aqueous electrolyte solution according to claim 1, wherein
the lithium salt further includes LiFSA and
a content of the LiFSA in the lithium salt is 20 mol % or more and 80 mol % or less.

6. The non-aqueous electrolyte solution according to claim 1, wherein a content of the fluoroethylene carbonate in the non-aqueous solvent is 5% by volume or more and 30% by volume or less.

7. The non-aqueous electrolyte solution according to claim 1, wherein the non-aqueous solvent includes methyl 3,3,3-trifluoropropionate (FMP).

8. The non-aqueous electrolyte solution according to claim 1, wherein the non-aqueous solvent includes 2,2,2-trifluoroethyl acetate (FEA).

9. The non-aqueous electrolyte solution according to claim 1, wherein the non-aqueous solvent includes 1-chloro-1,4,4,4-tetrafluorobutan-2-one (CTFB).

10. A non-aqueous electrolyte secondary battery including a positive electrode, a negative electrode, and a non-aqueous electrolyte solution, wherein
the non-aqueous electrolyte solution is the non-aqueous electrolyte solution according to claim 1.

11. The non-aqueous electrolyte secondary battery according to claim 10, wherein the negative electrode includes a negative electrode active material layer and the negative electrode active material layer includes a lithium salt.

12. A non-aqueous electrolyte secondary battery, comprising:
a positive electrode;
a negative electrode; and
a non-aqueous electrolyte solution, wherein
the non-aqueous electrolyte solution includes a lithium salt and a non-aqueous solvent;
the non-aqueous solvent includes fluoroethylene carbonate (FEC) and a chain carboxylate ester having a dielectric constant of 6.0 or more;
the lithium salt includes $LiPO_2F_2$ and respective concentrations of the $LiPO_3F_2$: and the $LiSO_3F$ in the non-aqueous solvent are 0.15 mol/L or more;
a composite film including Li, P, S, C, N, O, and F as constituent elements is formed on a surface of the negative electrode;
S atom is included at a proportion of 1% or more, and P atom is included at a proportion of 1% or more when the total amount of the constituent elements of the composite film is calculated as 100 atomic %.

13. The non-aqueous electrolyte secondary battery according to claim 12, wherein the negative electrode includes a negative electrode active material layer and the negative electrode active material layer includes a lithium salt.

* * * * *